(12) United States Patent
Savvides et al.

(10) Patent No.: US 12,511,743 B2
(45) Date of Patent: Dec. 30, 2025

(54) SYSTEM AND METHOD FOR DETECTING AND CLASSIFYING ABNORMAL CELLS

(71) Applicant: CARNEGIE MELLON UNIVERSITY, Pittsburgh, PA (US)

(72) Inventors: Marios Savvides, Pittsburgh, PA (US); Ibrahim Majeed Alkanhal, Pittsburgh, PA (US); Kai Hu, Pittsburgh, PA (US); Fangyi Chen, Pittsburgh, PA (US); Xiaoying Zhang, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 342 days.

(21) Appl. No.: 18/246,430

(22) PCT Filed: Nov. 19, 2021

(86) PCT No.: PCT/US2021/060131
§ 371 (c)(1),
(2) Date: Mar. 23, 2023

(87) PCT Pub. No.: WO2022/109295
PCT Pub. Date: May 27, 2022

(65) Prior Publication Data
US 2023/0368381 A1   Nov. 16, 2023

Related U.S. Application Data

(60) Provisional application No. 63/115,983, filed on Nov. 19, 2020.

(51) Int. Cl.
*G06V 10/774*   (2022.01)
*G06T 7/00*   (2017.01)
(Continued)

(52) U.S. Cl.
CPC .............. *G06T 7/0012* (2013.01); *G06T 7/11* (2017.01); *G06V 10/774* (2022.01); *G06V 10/82* (2022.01);
(Continued)

(58) Field of Classification Search
CPC .... G06V 10/82; G06V 10/774; G06V 20/698; G06V 10/764; G06V 2201/03;
(Continued)

(56) References Cited

U.S. PATENT DOCUMENTS

| | | | |
|---|---|---|---|
| 9,002,653 B2 * | 4/2015 | Semizarov | G16B 5/00 702/22 |
| 2005/0069963 A1 * | 3/2005 | Lokshin | B82Y 5/00 514/8.1 |

(Continued)

OTHER PUBLICATIONS

International Search Report and Written Opinion for the International Application No. PCT/US21/60131, mailed Feb. 8, 2022, 13 pages.
(Continued)

*Primary Examiner* — Tsung Yin Tsai
(74) *Attorney, Agent, or Firm* — KDW FIRM PLLC

(57) ABSTRACT

Disclosed herein is a method for training a network to detect and classify abnormal pathologies in images if cells. Specifically, the network uses a deep framework optimally trained to detect and classify abnormal cervical cells in pap smear images.

14 Claims, 7 Drawing Sheets

(51) Int. Cl.
  *G06T 7/11* (2017.01)
  *G06V 10/82* (2022.01)
  *G06V 20/69* (2022.01)

(52) U.S. Cl.
  CPC .......... *G06V 20/695* (2022.01); *G06V 20/698* (2022.01); *G06T 2207/10056* (2013.01); *G06T 2207/20081* (2013.01); *G06T 2207/20084* (2013.01); *G06T 2207/20132* (2013.01); *G06T 2207/30024* (2013.01); *G06V 2201/03* (2022.01)

(58) Field of Classification Search
  CPC .............. G06V 20/695; G06V 10/454; G06V 10/7753; G06V 10/7784; G06V 10/20; G06V 10/255; G06V 10/40; G06V 10/765; G06V 10/806; G06V 20/70; G06V 2201/07; G06V 40/10; G06T 2207/20084; G06T 7/0012; G06T 2207/20081; G06T 2207/30096; G06T 2207/30024; G06T 2207/10056; G06T 2207/10081; G06T 2207/30061; G06T 2207/10024; G06T 2207/10104; G06T 2207/20132; G06T 7/11; G06T 7/187; G06T 7/90; G06T 2207/30064; G06T 11/001; G06T 11/60; G06T 2207/30068; G06T 2207/30164; G06T 7/0004; G06F 18/24; G06F 18/214; G06F 18/2178; G06F 18/24155; G06F 18/2433; G06F 18/2414; G06N 3/08; G06N 3/045; G06N 3/0464; G06N 3/0455; G06N 3/047; G06N 3/084; G06N 3/088; G06N 3/0895; G06N 5/01; G06N 5/046; G06N 20/00; G06N 3/048; G06N 3/09; G06N 3/096; G06N 99/00; C12Q 2600/156; C12Q 1/6827; C12Q 1/6858; C12Q 1/686; C12Q 1/6869; C12Q 1/6886; C12Q 2531/113; C12Q 2565/30; C12Q 2565/514; C12Q 2565/625; C12Q 2600/112; C12Q 2600/158; C12Q 2600/16; G01N 33/57423; G01N 2800/56; G01N 2800/60; G16H 50/20; G16H 30/40; H04L 63/14; H04L 63/1425; H04N 23/63; Y02A 90/10
  See application file for complete search history.

(56) References Cited

U.S. PATENT DOCUMENTS

| | | | |
|---|---|---|---|
| 2007/0081712 A1* | 4/2007 | Huang | G06T 7/155 382/128 |
| 2010/0098306 A1* | 4/2010 | Madabhushi | G06V 20/695 382/128 |
| 2010/0144554 A1* | 6/2010 | Semizarov | G16B 20/10 706/13 |
| 2017/0091528 A1 | 3/2017 | Savvides | |
| 2018/0300456 A1* | 10/2018 | Eltoukhy | G16B 40/30 |
| 2018/0322327 A1 | 11/2018 | Smith | |
| 2019/0027252 A1* | 1/2019 | Calhoun | G06T 7/0012 |
| 2019/0256924 A1 | 8/2019 | Vogelstein | |
| 2020/0107787 A1* | 4/2020 | Sarkaria | A61B 5/682 |
| 2020/0374720 A1* | 11/2020 | Li | G06N 20/20 |
| 2022/0147841 A1* | 5/2022 | Chen | G05B 19/4184 |
| 2024/0331868 A1* | 10/2024 | Zhang | G16H 50/30 |
| 2024/0377539 A1* | 11/2024 | Lemarchand | G02B 27/0093 |

OTHER PUBLICATIONS

International Preliminary Report on Patentability for the International Application No. PCT/US21/60131, mailed Jun. 1, 2023, 5 pages.

* cited by examiner

SYSTEM AND METHOD FOR DETECTING AND CLASSIFYING ABNORMAL CELLS

RELATED APPLICATIONS

This application claims the benefit of U.S. Provisional Patent Application No. 63/115,983, filed Nov. 19, 2020, the contents of which are incorporated herein in their entirety.

BACKGROUND

Pathology images are widely used in diagnosis, clinical studies and treatment planning. However, interpreting pathology images requires the expertise of an experienced medical professional and is time-consuming. Thus, there is an emerging need for automated approaches to improve the efficiency, accuracy and cost effectiveness of the image analysis and imaging evaluation of the medical image data, and more particularly for pathology images.

Some medical images like pathology images are created from tissue samples with different staining and visualization methods for various diagnosing purposes. Solid tissue or biopsy of cytology suspension from the solid tissue can be used to generate pathology images for histology section or smear slides. In evaluating whether any abnormal tissues or cells exist in the image, any odd morphology from tissue debris or pigment particles will become background noises and will interfere with the interpretation. Some images are generated from radiology methods and are in color or gray scale. In some cases, the abnormal tissue structure or cell morphology are sparse compare with the normal population. It is time consuming to screen through large amounts of the samples before a few positive diagnoses are be made.

For example, cervical cancer is one of the most common cancer types among women. Many signs may appear, but at late stages, which may not be helpful for cancer prevention or early treatment. The standard diagnosis technique for cervical cancer is a test called a Pap smear, which is a visual examination of the cervix smears, examples of which are shown in FIG. 1. However, Pap smears must be analyzed by highly trained medical professionals who may need several hours to analyze a single patient. It is time consuming. The diagnostics conclusion is subjected to the experience of the individual pathologist. The quality of the slides and the extremely low percentage of positive cells in early stage patient's biopsy add additional challenges for the final precise diagnosis. Therefore, there is increasing interest in using machine learning and artificial intelligence algorithms to assist with pathology image's abnormality detection.

Over the last few years, there has been increasing interest in the use of deep learning algorithms to assist with abnormality detection on medical images. Conventionally, algorithms deploy deep learning networks to focus on binary classification of individual cell or healthy tissue structure. These approaches are highly-dependent on the quality of the images. Most of these approaches require huge amounts of high-quality data to train the classifier by recognizing cropped single cell units before any image recognition process and diagnosis could be made. In these approaches, abnormal cell classification must be processed over cropped single cell images. It is even more of a challenge to apply multiclass classification as the binary classifier in deep neural networks to achieve superior performance when the dataset is imperfect, imbalanced and sparse. When high imperfection exists in the images, either due to the late stage of cell malignancy or due to noise induced by the visualization technique, the conventional approaches become even less accurate and are even more inefficient.

In summary, conventional approaches employing deep learning networks face challenges in detecting and recognizing abnormal cell types, when various abnormal cell types are not evenly populated within the images. The severe imbalance that exists in the data over different classes is another challenge for medical image processing based on conventional deep learning algorithms.

SUMMARY OF THE INVENTION

Disclosed herein is system and method for improving the performance of Pap smear analysis using a deep framework that can automatically detect and classify abnormal cervical cells. Specifically, detection and classification is applied over six abnormal cell types grouped into three main categories. The main categories consist of glandular cells cancer (Adenocarcinoma), flat surface cells cancer (Squamous Cell Carcinoma) and other abnormal cells that associated with both cancer types that indicate to the doctor the seriousness of the cancer and help the doctor determine the treatment (EMT).

As shown in Table 1, the glandular cells group contains one abnormal class: Atypical glandular cells (AGC). On the other hand, flat surface cells group contains four abnormal classes: Atypical squamous cells of undetermined significance (ASCUS), low-grade squamous intraepithelial lesion (LSIL), atypical squamous cells that cannot exclude a HSIL (ASC-H), and high-grade squamous intraepithelial lesion (HSIL).

The dataset used to train the model used herein comprises more than 1200 multicell images with more than 1700 abnormal objects. An augmentation process is used to overcome the data imperfection and solve the problem of data imbalance by increasing the data of some abnormal types such as EMT and HSIL. By using different data augmentation techniques, such as rotation and flipping, the model is able to enhance the learning process and can give a good generalization over different abnormal types.

Disclosed herein is a novel framework for automating the analysis of abnormal cervical cells. As opposed to previous works that focus on binary classification of individual cells, the framework models abnormal cells detection directly from pap smear images, and then processes the abnormal cells into a multi-class classifier.

DETAILED DESCRIPTION

This application discloses an artificial intelligence-based image recognition approach that applies to images with imperfections and a severely imbalanced dataset to detect and recognize abnormal phenotypes, such as cancer-like cells or tissue structures, with high accuracy. The system and method are designed to automatically detect and classify abnormal cells using a deep framework. For example, the system and method may be used to detect and classify abnormal cervical cells from pap smear images.

Figure 1:
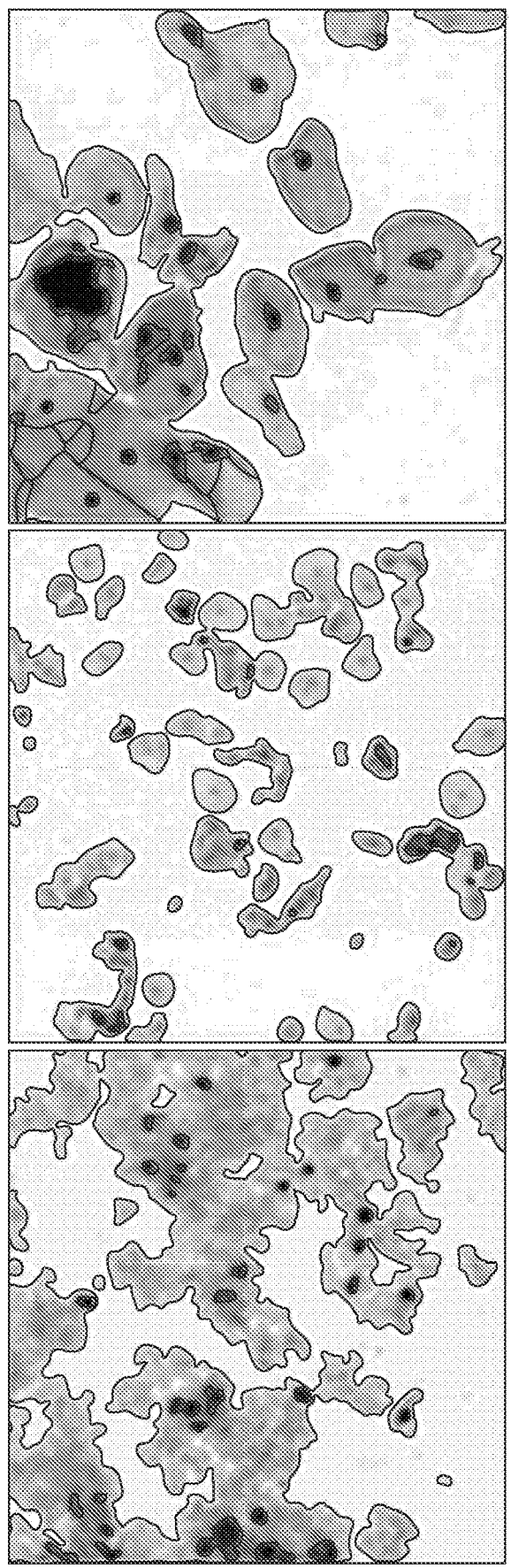
FIG. 1 is an example of a typical Pap smear image.
Figure 2:
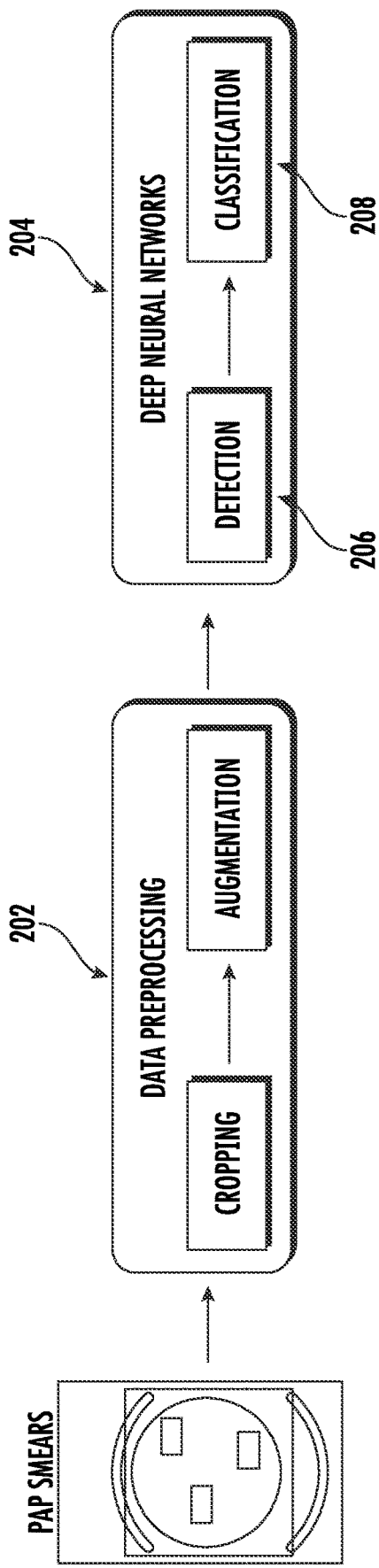
FIG. 2 is a schematic diagram of the training process.
Figure 3:
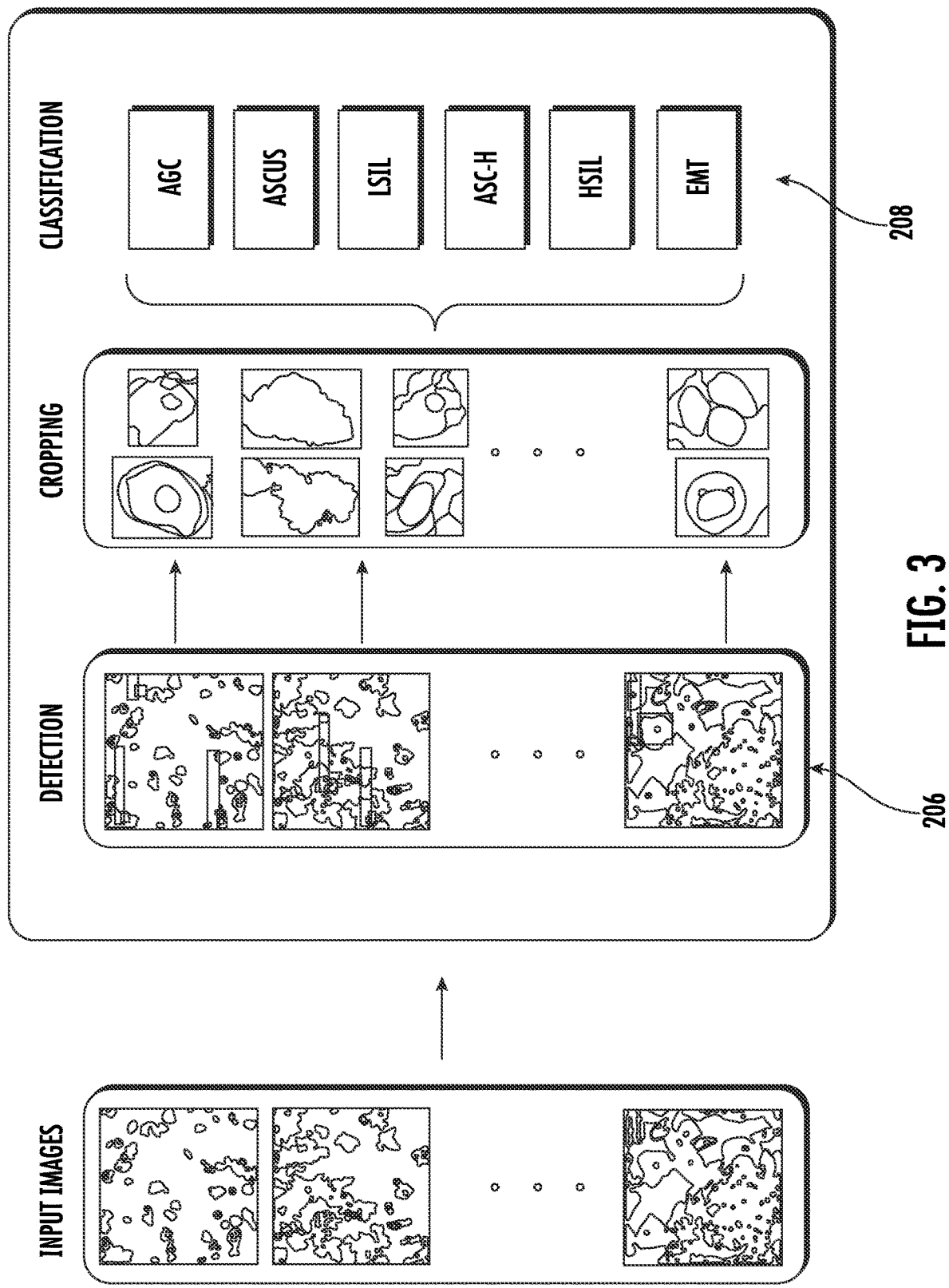
FIG. 3 is a schematic diagram of the testing process.

The system and method described herein optimizes the detection of abnormal cells and tissue structures by applying different data augmentation techniques and determining their effect on the performance of different abnormal cell detection and classification models. In one embodiment, the abnormal cells are cervical cancer cells and their variations. As shown in FIG. 2, the disclosed system and method consists of two main parts. First is the data preprocessing portion 202, where different data augmentation techniques are applied to balance the dataset. Thereafter, a deep framework 204 is constructed consisting of two parts, a deep detection convolutional neural network 206, and a deep classification convolutional neural network 208. Both parts are discussed in more detail later herein. In other embodiments, a self-supervised learning module may process images or cropped images to extract the general features and structure of a cell. The general features may be further labeled by the data preprocessing steps.

In some embodiments, the system may be trained with a pathology image dataset, wherein the dataset may be images from pap smears that contain a plurality of different microscopic slides which were collected and annotated by medical professionals. In one example, these slides have a total of 1256 cropped multi-cell images that include 1773 abnormal cells. In this dataset, there are six abnormal cell types: (AGC, ASCUS, LSIL, ASC-H, HSIL, EMT), as shown in Table 1 below. One challenge associated with this dataset is the severe imbalance that exists in the data between classes. One aspect of the disclosed system and method addresses this challenge using data augmentation, as described in next subsection.

TABLE 1

| Cell Type | Abnormal Cell Type | Number | Total |
|---|---|---|---|
| Glandula | Atypical glandular cells (AGC) | 287 | 287 |
| Squamous | Atypical squamous cells of und. significance | 950 | 1453 |
|  | Low-grade squamous intraepithelial lesions | 120 |  |
|  | Atypical squamous cells that cannot exclude a High-grade squamous intraepithelial | 331 |  |
|  |  | 52 |  |
| Other | Extra sign with both types (EMT) | 33 | 33 |
|  | Total |  | 1773 |

Augmentation acts as the first part of the proposed model shown in FIG. 2. The general purpose of the augmentation process is to overcome the lack of data in certain categories by generating different formats for the data. Various augmentation approaches such as rotation, flipping, adding noise and scaling may be applied. Accumulated augmentation processes may be applied. The augmentation processes may be optimized based on whether a certain augmentation process produces better performance in the detection and classification of abnormal cells, such as abnormal cervical cells. In one embodiment, when flipping and rotation techniques are used to expand the dataset, a rotation for every five degrees (which generates 72 different rotations per image) increases the performance in both detection and classification. This augmentation process increases the total number of images in the pathology image dataset previously mentioned to 90,432 multi-cell images for the detection task with 103,128 abnormal cells for the classification task in the case of abnormal cervical cells.

Further augmentations comprising various combinations of augmentation techniques may be applied, such as applying scaling and flipping operations to the rotated abnormal cells, in some classes to rebalance the dataset. In one embodiment for detection of abnormal cervical cells, augmentation technics such as applying both vertical and horizontal flipping can be applied to each rotated image in HSIL and EMT classes, which increases the total to 108,680 images.

The system and method further comprise a second module 204 comprising a deep framework. The deep framework performs two main tasks. The first task is detection, performed by model 206, to detect abnormal cells directly from the microscopic slides using deep detection convolutional networks. Then classification model 208 is applied to the abnormal cells to perform a multi-class classification.

Multi-cell images are segmented and processed through the detection model 206 to detect abnormal cells within the segmented images. In the object detection task 206, the family of region-based convolutional neural networks, such as Faster R-CNN, region-based fully convolutional networks (RFCN) and feature pyramid networks (FPN) may be applied. Other convolutional neural networks, such as deformable convolutional networks (DCNs), which are known to have a more dynamic and learnable receptive field, may be applied. The optimized convolutional neural network is configured based on the comparison of the detection performance over the original and the augmented datasets for these CNNs and DCNs.

In the classification process 204, multiple layer and different convolutional neural networks may be constructed to deal with the inherent structure of datasets with their unique imbalance and imperfection features. The CNN approach that provides good image representation of the data is selected and assigned to the dataset. The network comparison includes, but is not limited to: AlexNet, VGG-11 and ResNet-50. The main goal for these networks is to classify the detected abnormal cells into the designated number of classes. In one embodiment in which cervical cancer cells are classified, six classes are adopted, as shown in Table 1. The system compares the classification results for both original and augmented datasets.

With further reference to FIG. 2, the optimization of the detection and classification module are achieved by calculating the weight values that can minimize the loss generated by the loss function in both detection and classification networks during the training process. In addition to the loss function, the system may use a ring loss: a soft normalization metric in classification models disclosed in U.S. Pat. No. 12,165,068. In detection module 206, the ResNet pre-trains models on ImageNet to establish initial training weights. To overcome the overfitting problem, the system may use many approaches, including, but not limited to, adopting different probabilities of dropout in some fully connected layers and adopting subsampling of dominant classes in the dataset. The system can further rebalance the ratio between abnormal data and normal data, thus delaying overfitting and generating better validation and testing results.

In one embodiment, the performance of the system is evaluated by comparing the results for different detection and classification deep neural networks over the original dataset and comparing it to the results achieved when using augmented datasets.

In some embodiments, the system may use five GeForce GTX 1080 GPU units to train models, four units for detection and one unit for classification. The training process is applied to over 100 epochs to determine where the best validation result occurs. All models are validated for their performance on a subset dataset that randomly sampled from the original dataset, sometimes, containing about 20% of total images.

Next, the detection and classification experiments that were performed on both original and augmented datasets are discussed.

Figure 4:
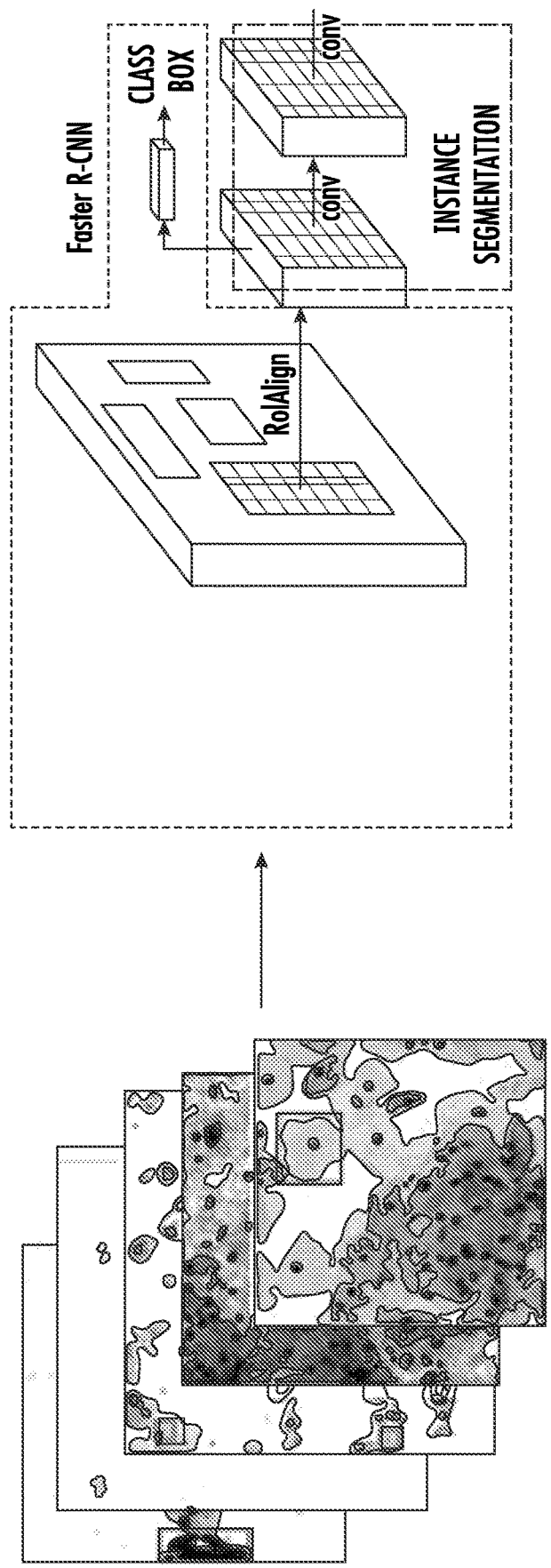
FIG. 4 is a diagram showing an exemplary detection model.
Figure 6:
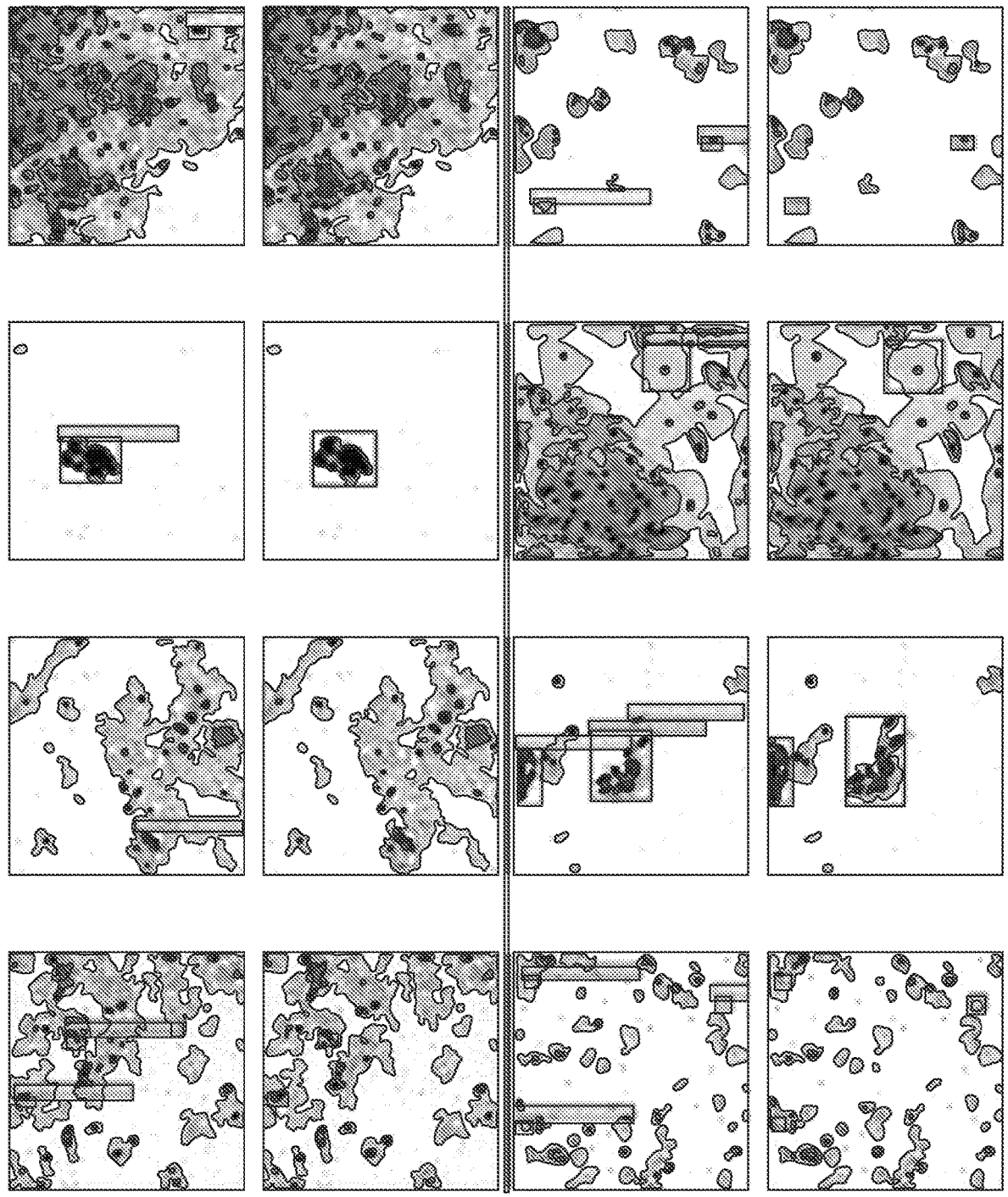
FIG. 6 shows detection results over some validation images.

Detection—In one embodiment for cervical cancer cell detection, for the abnormal cell detection task, the performance of different CNN and DCN architectures (Faster R-CNN, RFCN and FPN) was measured. FIG. 4 shows an exemplary implementation of the detection model, showing the use of a faster R-CNN. All networks, show a noticeably better performance after the seventh epoch due to the use of pretrained models. Experimentally, the RFCN detection model showed a superior performance to other models. In general, DCNs proved to perform better than CNNs in this task. The performance has an improvement after training over an augmented dataset. FIG. 6 shows detection results over some validation images.

Figure 5:
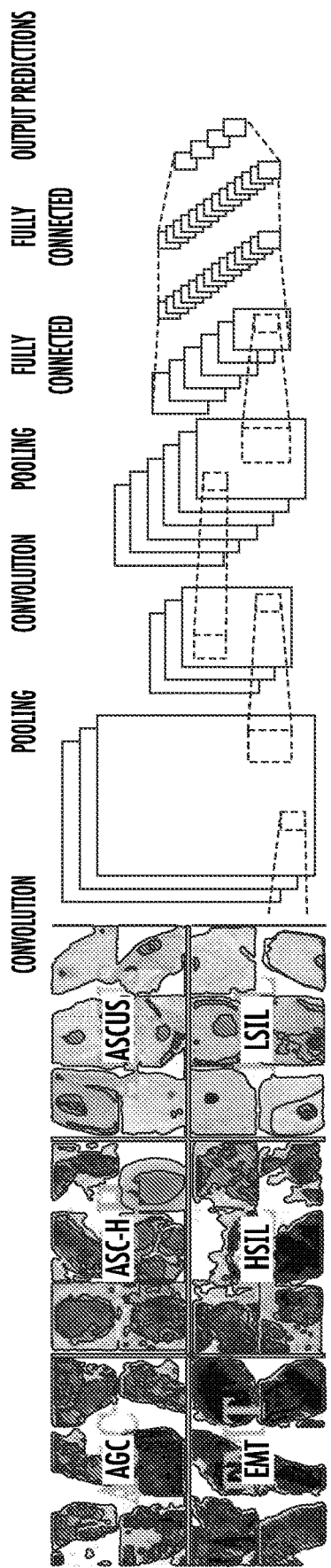
FIG. 5 is a diagram showing an exemplary classification model.

Classification—In one embodiment for cervical cancer detection and classification, for the abnormal cells classification task 208, the performance of three different architectures (AlexNet, VGG and ResNet) was measured. Four different measures used to evaluate validation results: Accuracy, F1 score, precision and recall. The system generates a noticeable better classification performance using an augmented dataset for the training of the models. Due to the sever imbalance between the abnormal classes, the classification models trained over the original dataset did not achieve the desired performance. In some embodiments, due to the lack of data, more complex networks could likely provide more overfitting and less generalized performance. In the embodiment for cervical cancer detection and classification, simple models (e.g., AlexNet and VGG) provided better performance in the classification task over a residual network (ResNet). FIG. 5 shows an exemplary implementation of the classification model.

Figure 7:
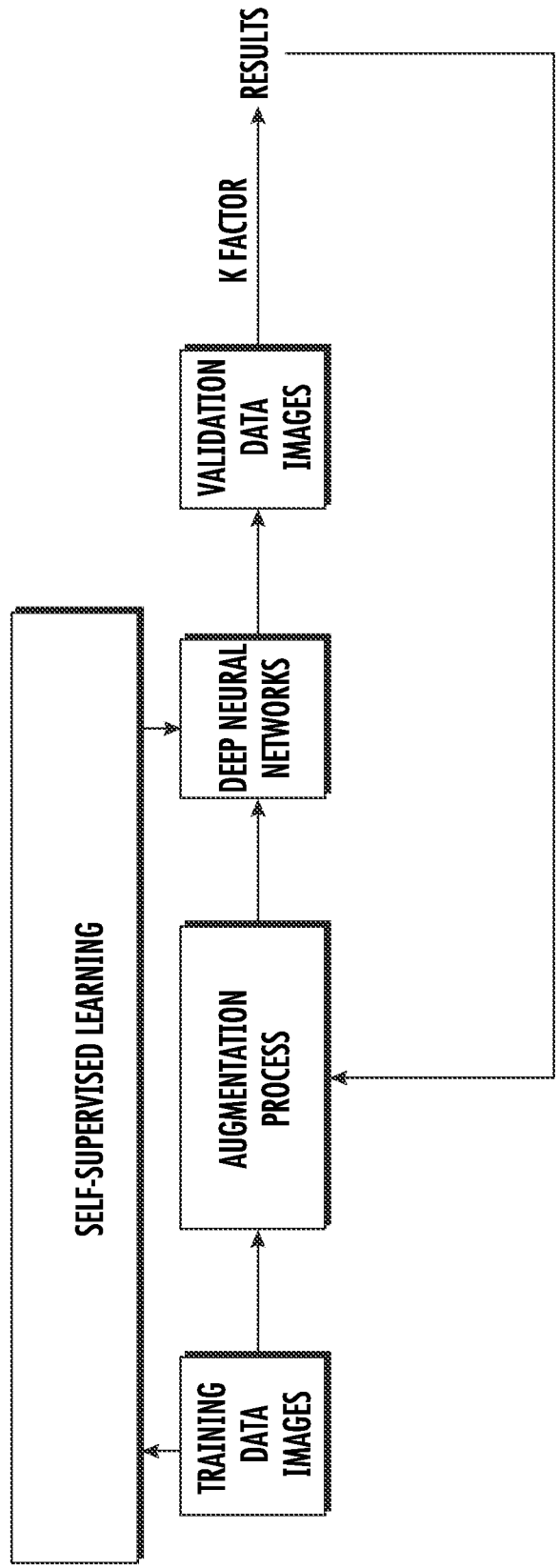
FIG. 7 is a schematic diagram of a training process using a K-Factor metric.

In some embodiments, as shown in FIG. 7, a K factor that measures the ratio of the probabilities of an image being a normal or abnormal may be used to further enhance the classification accuracy. The system may determine to report only the images according to a rule based on the K factor. FIG. 7 is a schematic diagram of an exemplary training process using the K-Factor. In any given input image, the system uses the detection algorithm (as illustrated in FIG. 4) to output many segments of interested areas. The system uses a classification algorithm, such as ResNet or VGG neural network, to calculate, for each segment, its normal and abnormal probability. The two probabilities will always sum to 100%. The system will then evaluate the segments based on the ratio of the abnormal probability and the normal probability. If the ratio is greater than K or smaller than 1/K, the system then processes the image to be selected for high accuracy prediction. The system will discard a segment if the ratio falls between K and 1/K. In this situation, the difference between the probability of normal and abnormal segments are too close to give precise prediction. This allows the system to give a more accurate prediction from part of the segments of the image where the segments have more polarized probability. The prediction of the whole image is determined by a voting process for each of the selected segments that falls within the K to 1/K range. If within each image there are more normal segments than abnormal segments, the whole image is predicted as a normal image. If there are more abnormal segments than normal segments, the whole image is predicted as an abnormal image.

The present invention illustrates various techniques and configurations that enable the integration and use of machine learning analysis in a data-driven image evaluation workflow. For example, machine learning analysis (such as trained models of image detection of certain medical conditions) may be performed upon medical imaging procedure data produced as part of a medical imaging study. The medical imaging procedure data may include image data captured by an imaging modality, and order data (such as data indicating a request for a radiological image read), each produced to facilitate a medical imaging evaluation (such as a radiology read to be performed by a radiologist or a diagnostic evaluation by another qualified medical professional).

For example, the machine learning analysis may receive and process images from medical imaging procedure data, to identify trained structures, conditions, and conditions within images of a particular study. The machine learning analysis may result in the automated detection, indication, or confirmation of certain medical conditions within the images, such as the detection of urgent or life-critical medical conditions, clinically serious abnormalities, and other key findings. Based on the result of the machine learning analysis, the medical evaluation for the images and the associated imaging procedure may be prioritized, or otherwise changed or modified. Further, the detection of the medical conditions may be used to assist the assignment of the medical imaging data to particular evaluators, the evaluation process for the medical imaging data, or implement other actions prior to, or concurrent with, the medical imaging evaluation (or the generation of a data item such as a report from such medical imaging evaluation).

As further discussed herein, the machine learning analysis may be provided on behalf of any number of machine learning algorithms and trained models, including but not limited to deep learning models (also known as deep machine learning, or hierarchical models) that have been trained to perform image recognition tasks, particularly for certain types of cancer like cell morphology upon medical images of tissue biopsy representations. As used herein, the term "machine learning" is used to refer to the various classes of artificial intelligence algorithms and algorithm-driven approaches that are capable of performing machine-driven (e.g., computer-aided) identification of trained structures, with the term "deep learning" referring to a multiple-level operation of such machine learning algorithms using multiple levels of representation and abstraction. However, it will be apparent that the role of the machine learning algorithms that are applied, used, and configured in the presently described medical imaging evaluation may be supplemented or substituted by any number of other algorithm-based approaches, including variations of artificial neural networks, learning-capable algorithms, trainable object classifications, and other artificial intelligence processing techniques.

In some of the examples, reference is made to medical imaging procedures and diagnostic evaluation of the images produced from such imaging procedures that would be performed with an image evaluation (e.g., pathological evaluation) by a licensed and credentialed pathologist. It will be understood that the applicability of the presently described techniques and systems will extend to a wide variety of imaging data (and other data representations) produced by various medical procedures and specialties, including those not involving traditional pathology imaging modalities. Such specialties include, but are not limited to, pathology, medical photography, medical data measurements such as electroencephalography (EEG) and electrocardiography (EKG) procedures, cardiology data, neuroscience data, preclinical imaging, and other data collection procedures occurring in connection with telemedicine, telepathology, remote diagnostics, and other applications of medical procedures and medical science. Accordingly, the performance of the data recognition and workflow modification techniques described herein may apply to a variety of medical image data types, settings, and use cases, including captured static images and multi-image (e.g., video) representations.

The description and the drawings herein sufficiently illustrate specific embodiments to enable those skilled in the art to practice them. Other embodiments may incorporate structural, logical, electrical, process, and other changes. Portions and features of some embodiments may be included in, or substituted for, those of other embodiments.

The invention claimed is:

1. A method for training a model to detect and classify abnormal cells comprising:
   creating a balanced training dataset by augmenting an annotated dataset of images containing examples of a plurality of different types of abnormal cells such that the training dataset has similar numbers of training examples from each type of abnormal cell;
   training a detection model using the balanced training dataset to detect the abnormal cells in a multi-cell image, the training of the detection model comprising:
      calculating a ratio of an abnormal and normal probabilities of a segment of the multi-cell image;
      comparing the ratio to a K-factor; and
      selecting a segment for high-accuracy prediction if the ratio is greater than K and discarding the segment if the ratio is between K and 1/K;
   cropping the multi-cell image to isolate the abnormal cells; and
   training a classification model using the balanced training dataset to classify the abnormal cells as a specific type of abnormal pathology.

2. The method of claim 1 wherein the detection model places bounding boxes around the abnormal cells.

3. The method of claim 2 wherein the images in the dataset comprise segments of pap smear images.

4. The method of claim 3 wherein the abnormal pathologies comprise glandular cells cancer (adenocarcinoma), flat surface cells cancer (squamous cell carcinoma) and other abnormal cells that associated with both cancer types.

5. The method of claim 4 wherein the classifier classifies abnormal pathologies as one of a group comprising atypical glandular cells (AGC), atypical, squamous cells of undetermined significance (ASCUS), low-grade squamous intraepithelial lesions (LSIL), atypical squamous cells that cannot exclude a HSIL (ASC-H), high-grade squamous intraepithelial lesions (HSIL) and extra sign with both types (EMT).

6. The method of claim 1 wherein augmenting the dataset comprises applying rotations, applying flips, adding noise and scaling, or a combination thereof, to images in the dataset.

7. The method of claim 1 wherein the detection model uses a region-based fully-convolutional network.

8. The method of claim 7 wherein the detection model uses a faster R-CNN model.

9. The method of claim 8 wherein initial weights of the detection model are obtained from a ResNet model pre-trained on ImageNet.

10. The method of claim 9 wherein a ring loss is applied in addition to the loss function to calculate the total loss.

11. The method of claim 1 wherein the classification model uses an AlexNet or VGG model.

12. The method of claim 1 wherein the training process uses a factor measuring a ratio of probabilities of an image being normal or abnormal to select optimal augmentation methods.

13. The method of claim 1, wherein training the detection model further comprises:
   predicting a multi-cell image as normal if there are more normal than abnormal segments in the multi-cell image; and
   predicting a multi-cell image as abnormal if there are more abnormal than normal segments in the multi-cell image.

14. The method of claim 1 further comprising:
   further augmenting the balanced training dataset by modifying existing examples to increase the numbers of all classes of abnormal cells.

* * * * *